United States Patent [19]

Loritsch et al.

[11] Patent Number: 5,037,625

[45] Date of Patent: Aug. 6, 1991

[54] PURIFIED QUARTZ AND PROCESS FOR PURIFYING QUARTZ

[75] Inventors: Kenneth B. Loritsch; Robert D. James, both of Asheville, N.C.

[73] Assignee: The Feldspar Corporation, Spruce Pine, N.C.

[21] Appl. No.: 599,544

[22] Filed: Oct. 17, 1990

Related U.S. Application Data

[62] Division of Ser. No. 475,595, Feb. 6, 1990, Pat. No. 4,983,370.

[51] Int. Cl.$^5$ ................................................ C01B 33/12
[52] U.S. Cl. ...................................... 423/340; 423/335
[58] Field of Search ................................ 423/335, 340

[56] References Cited

U.S. PATENT DOCUMENTS 4,804,422  2/1989  Papanikolav et al. .............. 423/340
4,818,510  4/1989  Jung ..................................... 423/340

FOREIGN PATENT DOCUMENTS 671691   10/1965  Belgium ............................. 423/340
0130808  1/1985   European Pat. Off. ............ 423/340
0156342  9/1982   Japan ................................. 423/340
239274   7/1969   U.S.S.R. ............................ 423/340

*Primary Examiner*—Olik Chaudhuri
*Assistant Examiner*—Kenneth Horton
*Attorney, Agent, or Firm*—Sprung Horn Kramer & Woods

[57] ABSTRACT

Quartz is purified by removing mineral impurities, particularly alkali metal impurities, from within the quartz crystal lattice structure. According to the disclosed process, quartz crystals are subjected to a pretreatment that removes surface bound impurities and then contacted with gaseous HCl at a temperature of from 800° C. to 1600° C. for a period of time of from a few minutes to several hours, thereby diffusing the mineral impurities to the quartz crystal surface where they form salts with chloride ion, removing the salts, and recovering the purified quartz crystals.

1 Claim, No Drawings 5,037,625

PURIFIED QUARTZ AND PROCESS FOR PURIFYING QUARTZ

This is a division of application Ser. No. 475,595, filed Feb. 6, 1990, now U.S. Pat. No. 4,983,370.

The present invention relates to purified naturally occurring quartz and to a process for purifying naturally occurring quartz by removing mineral impurities, particularly alkali metal impurities, from within the crystal lattice structure of the quartz.

BACKGROUND OF THE INVENTION

There is a rapidly growing demand for sources of exceptionally high purity quartz ($SiO_2$), particularly in respect to very low levels of alkali-metal impurities, such as sodium, potassium, and lithium ions. Such high purity quartz is needed to prepare quartz frequency and timing control devices for electronic applications, as high purity raw materials for optical fibers, to prepare fused quartz optical grade glass such as for halogen vapor lamps, and to prepare crucibles and other quartz apparatus for making high purity silicon crystals for transistors, integrated circuits, and other electronic and semi-conducting devices such as photovoltaic cells.

There is an extremely limited supply, far less than is required for the above needs, of naturally occurring quartz crystals and quartz sands of sufficient purity. To meet the rapidly expanding needs in adequate quantity it will be necessary to develop techniques for purifying existing quartz raw materials to meet these needs.

Although quartz is commonly found in nature, either in a relatively pure state as in naturally occurring sand or in the form of complex ores such as pegmetites, granites, flints, shales, and many others, it is almost always associated with substantial impurities consisting chemically of $Al_2O_3$, $K_2O$, $Na_2O$, $Li_2O$, $Fe_2O_3$, $FeO$, $TiO_2$, and $ZrO_2$.

These impurities are usually present as distinct (i.e. non-quartz) minerals such as feldspar (complex K, Na, Li aluminosilicates), micas, garnets (iron-containing aluminosilicates), Zircon, ilmenite, and many others.

These impurities occur in the following modes:
1) As loosely associated minerals, not chemically-bonded to the quartz crystal;
2) As mineral fragments which are chemically and physically bonded to the quartz crystal at their surfaces;
3) As minerals which are occluded within the quartz grains or surrounded by an aggregate of quartz crystals bonded to one another; and
4) As interstitial ions substituted within the quartz lattice itself. Chiefly these are as $Al^{+3}$ and $Fe^{+3}$ substituted for $Si^{+4}$ in the $Si_2$ three dimensional lattice. When this occurs they are usually accompanied by a $Li^{+1}$, $K^{+1}$, $Na^{+1}$, or $H^{+1}$ ion to maintain the electrical neutrality of the $SiO_2$ lattice.

In an attempt to remove these impurities from the quartz, a variety of techniques have been commonly employed. Where different types of impurities were present, a number of these techniques were used in sequence.

For example, a typical quartz purification procedure will usually include crushing, grinding, washing and size classification by air classification, sedimentation or screening. These steps separate physically associated impurities and water-soluble impurities and give a relatively uniform and small particle size material for further operations.

Next, heavy liquid separations, or a sequence of selective froth flotations employing different flotation agents, pH's and ion-adsorption salts such as fluoride will be employed to further separate physically associated minerals such as feldpars, micas, and garnets from the quartz crystals This may be followed by various magnetic separation methods for further removal of garnets and other magnetic impurities.

The above techniques will remove the majority of physically associated impurities but are not effective in removing chemically bonded impurities, occluded impurities, or particularly in removing interstitial impurities which are part of the quartz lattice itself.

Consequently, most procedures will next employ chemical reaction techniques such as leaching with aqueous caustic solutions, aqueous acidic solutions of various sorts, or high temperature (600 to 1100° C.) reactions with various gaseous reagents. Included among the latter have been chlorinating acidic gases such as $SO_2$, $SO_3$, HCl, etc., and reductive chlorinative agents such as phosgene, carbon plus chlorine, HCl and the like. See, for example, G.D.R. 160, 967, wherein the chlorinating agents mentioned include HCl, $Cl_2$, $Cl_2/CO$ mixtures, $CCL_4$, and polyvinyl chloride, all in the presence of air; Japanese Patent Application Showa 61-106317, which discloses chlorination via insitu oxidation of HCl/air mixtures; and G.D.R 120,860, which discloses chlorination with aqueous HCl and aqueous HCl/HF mixtures.

The purpose of these procedures is to attempt a selective reaction, i.e., the user hopes that the rate of leaching or gaseous attack by reagents such as aqueous NaOH, HF, or gaseous phosgene or HCl with impurities such as feldspar, mica, garnet, etc., will be sufficiently more rapid than the reaction with quartz to accomplish selective purification.

These selective chemical attack procedures have been only moderately successful in removing chemically-bonded impurities adhering to the surfaces of the quartz crystals but have not in general been successful in removing interstitial (i.e. lattice-held) impurities. This was to be expected since it is clear that any reagent functioning by a chemical reaction mechanism would have to also react with the $SiO_2$ martix itself in order to reach interstitial impurities. It is clear that if this occurred it could only do so by destroying the very $SiO_2$ matrix which is the desired end product.

The achievement of high levels of purity from alkali metals via recrystallization of quartz from purified raw materials in computer controlled recrystallization vessels is described in an article by Aulich et al. J. of Material Science, (1984) p 1710. These authors used purified quartz to prepare and spin high purity glasses which were subsequently acid leached with hot aqueous HCl to leave a matrix of silica of high purity. This method is likely to be extremely expensive.

Also, UK patent application G.B. 2166434H discloses preparation of high purity vitreous silica by application of a polarizing D.C—potential across the crucible wall of from 10 to 1000 volts per millimeter of wall thickness at temperatures of from 800–2000° C. Substantial purification of alkali metal impurities is claimed. Again, this method is likely to be extremely expensive.

Finally, GDR 160,967 discloses a process for purifying quartz raw materials by subjecting quarts raw materials contaminated with mica and/or chlorite-group minerals to a mechanical preparation and treatment with an aqueous HCl or aqueous HCl/HF mixture, followed by a heat treatment at 800–1200° C., optionally in the presence of HCl gas, followed finally by an HF leach. Ultimately, the levels of alkali metal impurities are reduced but the levels are still too high. Thus, the quartz produced by this process still contains too much alkali metal impurity to be used in applications demanding exceptionally high purity quartz.

Accordingly, it is an object of the present invention to provide a process for obtaining highly purified quartz, which is substantially free of interstitial impurities, particularly interstitial alkali metal impurities.

It is also an object of the present invention to provide a process whereby such highly purified quartz can be obtained without causing damage to the $SiO_2$ matrix.

It is further an object of the invention to provide a process whereby such highly purified quartz can be obtained efficiently and at a reasonable cost.

SUMMARY OF THE INVENTION

The foregoing objectives have been achieved with the present invention, which relates to a process for purifying naturally occurring quartz minerals from associated mineral impurities and particularly from interstitial alkali-metal impurities, by subjecting the raw quartz material to a pretreatment which removes substantially all of the impurities bound to the surface of the quartz crystals and then contacting the quartz crystals with gaseous hydrochloric acid at a temperature of from 800° C. to 1600° C. for a period of from a few minutes to several hours, thereby diffusing the interstitial alkali metal impurities to the quartz crystal surface where they form alkali metal salts, removing the alkali metal salts, and recovering the purified quartz crystals. During the process, dissociated protons from the HCl gas counter-diffuse into the quartz lattice to maintain atomic neutrality as the alkali metal ions diffuse to the surface.

By "naturally occurring quartz" is meant quartz that is not amorphous and/or quartz that has not been dissolved and recrystallized.

The HCl counterdiffusion process is conducted on materials which have previously been substantially purified by crushing, grinding, washing, selective froth flotation, magnetic separations, and selective leaching with aqueous HF solutions to free the quartz crystals from associated physically and chemically bonded minerals such as feldspar, mica, garnet, various clay minerals and the like. Pretreatment in this manner is necessary to achieve low levels of alkali metal impurities.

The process of the invention purifies quartz crystals from alkali metal impurities to levels of less than three parts per million and preferably to levels below one part per million based on the weight of the quartz. Also, the removal of iron and aluminum impurities has been indicated.

DETAILED DESCRIPTION OF THE INVENTION

The most difficult impurities to eliminate from quartz crystals are interstitual impurities substituted directly into the quartz lattice itself. Physical separation methods such as grinding, screening, density separations, and magnetic separations are ineffective since the impurities are distributed uniformly through the crystal lattice. Chemical methods such as selective flotation or differences in chemical reactivity towards acid leaching, reductive chlorination, chlorination, or basic leaching are ineffective since it is necessary to react the matrix and the impurities simultaneously with the consequent destruction of the quartz.

Although this is used in some of the known methods such as dissolution and recrystallization, transformation into fused silica glass and purification of this by chlorination or formation of glass fibers and leaching in aqueous HCl, these methods are complex and expensive. The same must be said for high temperature solid state electrolysis.

Thus the prior art has not disclosed a method capable of eliminating alkali metal impurities which is reasonable in cost, applicable to a continuous large scale process, and results in quartz containing such low levels of alkali metal impurities.

The process of this invention achieve these objectives by means of a diffusional substitution of alkali metal ions such as $Na^{+1}$, $K^{+1}$, and $Li^{+1}$ by $H^{+1}$. Essentially the HCl gas purification reaction (1) of this invention consists of:

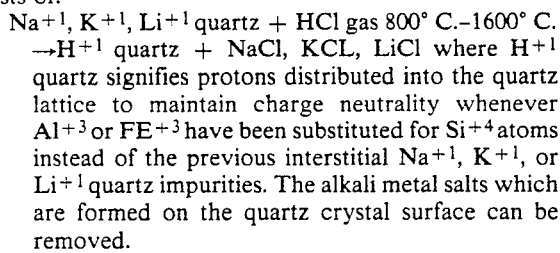

quartz signifies protons distributed into the quartz lattice to maintain charge neutrality whenever $Al^{+3}$ or $FE^{+3}$ have been substituted for $Si^{+4}$ atoms instead of the previous interstitial $Na^{+1}$, $K^{+1}$, or $Li^{+1}$ quartz impurities. The alkali metal salts which are formed on the quartz crystal surface can be removed.

The conditions for achieving this diffusional substitution turn out to be surprisingly stringent. Among the most important conditions are the following:

1) A thermally stable proton-containing acid;
2) The anion of which thermally stable proton-containing acid is relatively unreactive with silica;
3) The acid must be stable at temperature high enough to allow for rapid diffusion of $H^+$ ions into crystalline quartz and sodium, potassium or lithium ions out;
4) The anion must react with sodium, potassium, and lithium cations to form stable compounds that are easily removed from the quartz crystal surface.
5) The acid must be at sufficiently high concentrations that reaction (1) is favored thermodynamically and kinetically.

Among common acids, most are not thermodynamically stable at the relatively high temperature (800° C. to 1600° C.) required. For Example $H_3PO_4$, $H_2SO_4$, HBr, HI, $H_2CO_2$, $CH_3COOH$, etc., would all be unsuitable.

Phosphoric acid and sulfuric acid decompose into $H_2O$ and the corresponding acid anhydride (i.e. $P_2O_5$ or $SO_3$) at temperatures well below those required for rapid diffusion. Once they have decomposed, $H_2O$ apparently does not furnish sufficient protons to allow diffusional replacement of alkali metal ions. HBr, HI, formic and acetic acids decompose thermally at these temperatures also.

HF reacts with $SiO_2$ to form $H_2O$ and $SiF_4$. Thus of all the more common acids, only HCl combines the right properties to be effective.

Essentially pure HCl is preferred although 50% $HCl/N_2$, still functions. Even 5% HCl is operative but the rate of sodium and potassium removal is below that achieved at higher HCl concentrations.

Times required are from a few minutes at the higher temperature to several hours at the lowest operable temperature.

The amount of HCl required should be at least stoichiometrically equivalent to the sum of alkali metal ions to be replaced; preferably it should be several times as large on a molar basis.

The physical arrangement can be varied a great deal and can include a fixed bed where the quartz forms the stationary phase. It may also include fluid bed and tumbling bed arrangements. The latter are preferred at higher temperatures where sticking and sintering of the quartz grains may otherwise become a problem.

Purification of the quartz crystals from physical and chemically bonded impurities must be as complete as possible prior to diffusional purification with HCl gas. Otherwise, alkali metal impurities present in these physical and chemically bonded impurities tend to diffuse into the quartz crystal at the same time that interstitial alkali metal impurities are being diffused out of the quartz crystal by the HCl gas treatment. The overall result in this situation is that the overall removal of interstitial alkali metal impurities is significantly hampered since the alkali metal impurities that diffuse into the quartz from the physical and chemically bonded impurities tend to replace those that are being diffused out of the quartz by the HCl gas treatment. Therefore, a pretreatment which removes substantially all of these surface bound impurities is carried out prior to the HCl gas treatment. This pretreatment preferably comprises two cycles of selective flotation, a magnetic separation, and at least one HF aqueous leach. Pretreatment in this manner removes substantially all of the surface bound impurities and the HCl gas treatment is more effective with the result that substantial levels of purification from alkali metal impurities are observed. The selective flotation, the magnetic separation, and the HF leach can all be carried out using procedures well known in the art.

The rate of removal of alkali metal impurities is dependent on the partial pressure of the HCl gas and to the time and temperature of treatment. Treatment at low HCl partial pressures is relatively ineffective. The best results are obtained using HCl partial pressures between about 0.7 to about 1.0. The HCl gas may be employed with or without a diluent gas. Particularly at higher temperatures, it is preferred to use inert gases as the diluent, rather than air, since air will have a tendency to oxidize some of the HCl into water and chlorine gas, thereby, lowering the overall effectiveness of the treatment.

The HCl gas treatment is conducted at a temperature of 800 to 1600° C. Preferably the temperature is at least 1100° C. More preferably the temperature is at least 1200° C. The HCl gas treatment is conducted over a period of time of from a few minutes to several hours.

The following nonlimiting examples are illustrative of the present invention and demonstrate the purification of granular quartz when subjected to high temperatures in an environment of anhydrous HCl gas. Furthermore, the examples illustrate the criticality of temperature, the advantages of 100% HCl over lesser concentrations, the usefulness of using a quartz material previously purified by dissolution of admixed contaminants in an aqueous acidic solution, the importance of preselecting a starting material with the lowest possible concentration of $Al^{3+}$, the advantages of high temperature treatment with HCl over treatment at the same temperature with various diatomic gases or other gaseous compounds and the degree of impurity reductions with respect to treatment time.

NOTE: A "pretreated quartz sample" is one that has been subjected to two cycles of selective flotation, magnetic separation, and at least one HF aqueous leach prior to the HCl gas treatment.

EXAMPLE 1 (criticality of temperature)

A pretreated quartz sample containing 0.40 ppm Fe, 1.30 ppm Na, 0.90 ppm K and 0.50 ppm Li was treated for 1 hour at varying temperatures in a 100% anhydrous HCl gas atmosphere. The measured impurity levels for each temperature increment are listed below.

| Temperature (°C.) | Fe (ppm) | Na (ppm) | K (ppm) | Li (ppm) |
|---|---|---|---|---|
| 800 | 0.3 | 1.3 | 0.9 | 0.5 |
| 900 | 0.3 | 1.3 | 0.8 | 0.5 |
| 1000 | 0.2 | 0.9 | 0.7 | 0.5 |
| 1100 | 0.2 | 0.3 | 0.6 | 0.5 |
| 1200 | 0.2 | <0.05 | 0.1 | 0.5 |

EXAMPLE 2 (The advantages of 100% HCl over Lesser Concentration)

A pretreated quartz sample containing 0.40 ppm Fe, 1.0 ppm Na, 0.7 ppm K, and 0.4 ppm Li was treated for 1 hour at 1200° C. in an atmosphere of varying concentrations of a HCl/Dry air mixture. The measured impurity levels for each HCl concentration are listed below.

| HCl Partial Pressures | | | | | |
|---|---|---|---|---|---|
| HCl | Dry Air | Fe (ppm) | Na (ppm) | K (ppm) | Li (ppm) |
| .25 | .75 | 0.2 | 0.08 | 0.29 | 0.4 |
| .50 | .50 | 0.2 | 0.08 | 0.27 | 0.4 |
| .75 | .25 | 0.2 | 0.06 | 0.21 | 0.3 |
| 1.00 | 0 | 0.2 | 0.05 | 0.18 | 0.3 |

EXAMPLE 3 (The usefulness of using wet chemical prior purification)

Two quartz samples were treated for 2 hours at 1200° C. in a 100% anhydrous HCl atmosphere. One sample was pretreated in accordance with the present invention and the other was purified by processing in an aqueous HF solution. The measured impurity levels for the before and after Hi-Temp/HCl treatments are listed below.

| | Aqueous HF | | Pretreated Quartz Sample | |
|---|---|---|---|---|
| | Before | After | Before | After |
| Fe (ppm) | 9.0 | 1.7 | 0.4 | 0.2 |
| Na (ppm) | 88 | 10 | 1.4 | 0.1 |
| K (ppm) | 55 | 4.0 | 1.0 | 0.2 |
| Li (ppm) | 0.5 | 0.5 | 0.5 | 0.5 |

EXAMPLE 4 (The importance of preselecting low $Al^{3+}$ starting material)

Five pretreated quartz samples were treated for various times at 1200° C. in a 100% HCl atmosphere. The measured $Al^{3+}$ values before and after treatment and the treatment times are listed below.

| Before Hi-Temp/HCl Processing $Al^{3+}$ (ppm) | After Hi-Temp/HCl Processing $Al^{3+}$ (ppm) | Treatment Time (hrs) |
| --- | --- | --- |
| 20.5 | 20.5 | 1 |
| 12.3 | 12.2 | 2 |
| 20.8 | 20.5 | 1 |
| 18.7 | 18.8 | 1 |
| 13.0 | 12.8 | 1 |

EXAMPLE 5 (The advantage of HCl over other gases)

Various pretreated quartz samples all of which had the same pegmatite ore origin were for identical times at 1200° C. in various chemical atmospheres. The before and after impurity levels are listed below.

|  | Before | After | Before | After | Before | After |
| --- | --- | --- | --- | --- | --- | --- |
|  | AIR | | $H_2$ | | $Cl_2$ | |
| Fe (ppm) | 0.6 | 0.6 | 0.4 | 0.3 | 0.5 | 0.3 |
| Na (ppm) | 0.8 | 0.7 | 1.4 | 1.4 | 1.2 | 1.3 |
| K (ppm) | 0.8 | 0.6 | 1.0 | 1.1 | 0.8 | 0.7 |
|  | $COCl_2$ | | $SiCl_4$ + HCl | | | |
| Fe (ppm) | 0.5 | <0.2 | 0.3 | 0.3 | | |
| Na (ppm) | 1.0 | 0.9 | 0.9 | 0.24 | | |
| K (ppm) | 0.6 | 0.2 | 0.6 | 0.32 | | |

EXAMPLE 6 (Effect of processing time)

A pretreated quartz sample containing 0.30 ppm Fe, 0.80 ppm Na, 0.41 ppm K, and 0.3 ppm Li was treated for varying durations of time at 1200° C. in a 100% HCl atmosphere. The measured impurity levels for each increment of time are listed below.

| Time (mins.) | Fe (ppm) | Na (ppm) | K (ppm) | Li (ppm) |
| --- | --- | --- | --- | --- |
| 7.5 | 0.2 | 0.45 | 0.30 | 0.3 |
| 15 | <0.2 | 0.20 | 0.30 | 0.3 |
| 30 | <0.2 | 0.06 | 0.26 | 0.3 |
| 60 | <0.2 | 0.05 | 0.06 | 0.3 |
| 120 | <0.2 | 0.05 | 0.03 | 0.2 |

While there has been described what is considered to be preferred embodiments of the invention, variations and modifications in the preferred embodiments will be apparent to those skilled in the art once they become familiar with the basic concepts of the invention. Therefore, it is intended that the appended claims shall be construed to include all such variations and modifications as would occur to one skilled in the art.

We claim:

1. Naturally occurring quartz, which is substantially free of alkali metal impurities and which has been purified by a process which comprises (1) subjecting the quartz raw materials to a treatment which removes substantially all of the surface bound impurities to yield treated quartz crystals, which comprises two cycles of selective flotation, magnetic separation and at least one HF aqueous leach, (2) followed by subjecting the treated quartz crystals to a vapor containing HCl gas at a temperature of 800 to 1600° C. to diffuse the interstitial alkali metal impurities to the surface of the treated quartz crystals to yield purified quartz crystals, and (3) recovering the purified quartz crystals.

* * * * *